(12) United States Patent
Thompson

(10) Patent No.: US 10,246,893 B2
(45) Date of Patent: Apr. 2, 2019

(54) APPARATUS WITH SPACER FOR REPAIRING A POOL FITTING

(71) Applicant: Steven E. Thompson, Oldsmar, FL (US)

(72) Inventor: Steven E. Thompson, Oldsmar, FL (US)

( * ) Notice: Subject to any disclaimer, the term of this patent is extended or adjusted under 35 U.S.C. 154(b) by 0 days.

(21) Appl. No.: 15/046,806

(22) Filed: Feb. 18, 2016

(65) Prior Publication Data

US 2018/0051477 A1  Feb. 22, 2018

(51) Int. Cl.
| | |
|---|---|
| *E04H 4/14* | (2006.01) |
| *F16L 55/17* | (2006.01) |
| *B23P 6/00* | (2006.01) |
| *E04H 4/12* | (2006.01) |
| *F16L 55/132* | (2006.01) |
| *F16L 55/179* | (2006.01) |
| *F16L 5/08* | (2006.01) |

(52) U.S. Cl.
CPC ............... *E04H 4/14* (2013.01); *B23P 6/00* (2013.01); *E04H 4/12* (2013.01); *F16L 55/132* (2013.01); *F16L 55/179* (2013.01); *F16L 5/08* (2013.01)

(58) Field of Classification Search
CPC ..... E04H 4/14; E04H 4/12; B23P 6/00; F16L 5/132
USPC .......................... 4/496; 29/402.01; 137/377
See application file for complete search history.

(56) References Cited

U.S. PATENT DOCUMENTS

| | | | | |
|---|---|---|---|---|
| 3,353,565 A * | 11/1967 | Markham | ............. | F16L 21/022 114/65 R |
| 3,494,504 A * | 2/1970 | Jackson | ................ | F16L 55/132 138/89 |
| 4,391,005 A * | 7/1983 | Goettl | .................... | E04H 4/169 134/167 R |
| 4,731,887 A * | 3/1988 | Henkin | .............. | A61H 33/6073 4/492 |
| 4,752,979 A * | 6/1988 | Goacher, Sr. | ............. | E04H 4/12 285/185 |
| 5,604,939 A * | 2/1997 | Widener | ............... | E04H 4/1272 4/496 |
| 6,662,490 B1 * | 12/2003 | Aesch, Jr. | ............... | A01M 1/24 43/124 |
| 6,883,546 B1 * | 4/2005 | Kobylinski | ......... | F16L 55/1141 138/89 |
| 2011/0232793 A1 * | 9/2011 | Polivka | .................. | B25B 13/48 138/98 |

(Continued)

*Primary Examiner* — Benjamin R Shaw

(57) ABSTRACT

An apparatus for repairing a fluid leak, thru a crack within the body of a pool return fitting, or in a pipe of close proximity to a pool return fitting, wherein an apparatus comprising of two specially shaped cylindrical flow-thru rubber plugs, wherein a threaded tube thru the center of the rubber plugs, being separated by a spacer sealed with rubber washers and rigid washers, are retained at one end by a flare in said tube, and threaded on the other end, secured by a locking nut over a rigid washer against a conical wedge. When the locking nut is tightened, the rubber plugs radially expands within the return line pipe and the pool return fitting, sealing any leak occurring between the pool return fitting and the return line pipe, wherein fluid may still pass thru the center tube. A return eyeball cap is threaded onto the center tube, wherein the eyeball is threaded female internally. The apparatus may be installed in a pool with or without water in the pool.

15 Claims, 9 Drawing Sheets

(56) References Cited

U.S. PATENT DOCUMENTS

2016/0040819 A1* 2/2016 Jang ................. B29C 33/04
　　　　　　　　　　　　　　　　　　138/89
2016/0090750 A1* 3/2016 Thompson ............ E04H 4/14
　　　　　　　　　　　　　　　　　　29/402.01

* cited by examiner

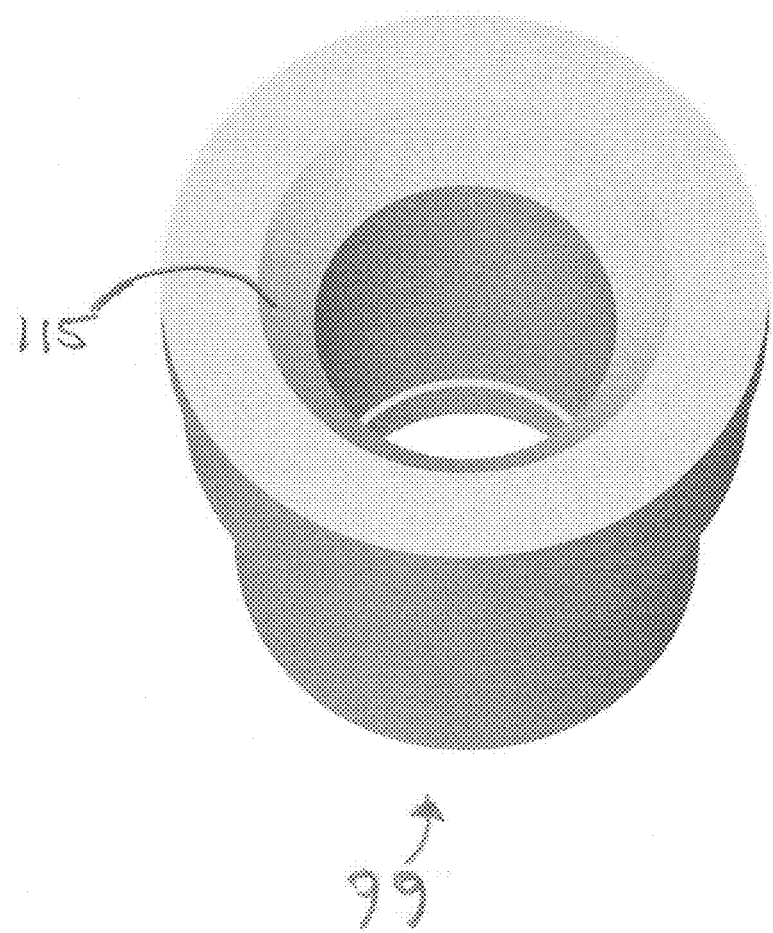

APPARATUS WITH SPACER FOR REPAIRING A POOL FITTING

STATEMENT REGARDING FEDERALLY SPONSORED RESEARCH/DEVELOPMENT

Not Applicable.

BACKGROUND

This invention relates to the field of plumbing drain plugs generally, and more specifically to plumbing drain plugs as they relate to swimming pool leaks and swimming pool leak detection.

DISCUSSION OF PRIOR ART

The present invention is a variation of another idea presented in a previous application by the same inventor. Both applications most closely resemble plumbing drain plugs, especially flow-thru plumbing drain plugs. A flow-thru drain plug is a plug that can be secured in place thru a method of compression, and has an open center that allows fluid or gases to pass thru the apparatus, once inflated or expanded, and secure the plug in place. Flow-thru plugs are often used in the application of pressure testing and leak detection.

In the case of the present invention, an adaptation of a flow-thru plug is employed to solve the problem of a leaking or cracked fitting or pipe. In the past, a leak or crack, such as described, would require the cutting of a pool or spa decking to access a fitting or pipe for replacement. This requires the draining of the pool or spa, cutting and removal of concrete or other decking materials, digging down thru soils to the elevation of the plumbing, and then replacing the damaged fitting or pipe. Often this process requires means of creative plumbing techniques, and is very costly. This type of damage on a pool or spa most often occurs on a fiberglass shell pool or spa, but is not limited to other construction types, such as concrete or vinyl. Therefore it is advantageous to have available a method and apparatus by which the aforementioned damages may be repaired in a cost effective manner while also reducing the amount of disturbance to a deck and surrounding areas. It is to this need that the present invention is directed.

After review of the background, summary and detailed description of the preferred embodiments, in conjunction with the drawings, specifications and claims, it should be apparent to anyone skilled in the field of Prior Art, that the present invention uniquely solves the need for an apparatus with spacer for repairing a pool fitting or pipe on a swimming pool, spa, fountain or pond when it otherwise is difficult or costly to do so.

SUMMARY

Wherein it is the nature of soils to shift, expand and contract, on occasion, a pool or spa fitting and plumbing can be stressed to the point of cracking and leaking. Repairs to such damages may be costly and disturb the continuity of the appearances of a deck or patio. Therefore, the need arises for a cost effective, quality repair method to address the said damages.

In the case of the present invention, an adaptation of a flow-thru plug is employed to solve the problem of a leaking or cracked fitting or pipe. Wherein the flow-thru plug is compressed between two cone-shaped washers that create a watertight seal at each end of the apparatus, of which the apparatus is positioned over a leak in a fitting or pipe, isolating the leak. The center tube of the apparatus then allows fluid to pass thru the apparatus. A customized eyeball fitting gives the exposed portion of the apparatus a finished appearance, completing the repair, whereby rendering the repair unnoticeable to a pool user. In the past, a leak or crack such as described would require the cutting of a pool or spa decking to access a fitting or pipe for replacement. This requires the draining of the pool or spa, cutting and removal of concrete or other decking materials, digging down thru soils to the elevation of the plumbing, and then replacing the damaged fitting or pipe. Often this process requires means of creative plumbing techniques, and is very costly. This type of damage on a pool or spa most often occurs on a fiberglass shell pool or spa, but is not limited to other construction methods, such as concrete or vinyl. Therefore it is advantageous to have available, a method and apparatus by which the aforementioned damages may be repaired in a cost effective manner, while also reducing the amount of disturbance to a deck and surrounding areas. It is to this need that the present invention is directed.

BRIEF DESCRIPTION OF THE DRAWINGS

In the figures, similar reference numbers refer to similar parts typical through various figures unless noted otherwise. Numerals with letter characters in addition to numerals such as "101A" or "101B" the letter character designations for reference numerals indicates that two similar parts or elements are present in the same figure. Letter character designations for reference numerals may be omitted when it is intended that a reference numeral encompass all parts having the same reference numeral in all figures.

For a more complete understanding of the present invention, and for further details and advantages thereof, reference is now made to the following detailed description taken in conjunction with the following drawings, in which:

FIG. 9 is a perspective view of rubber plug (1) detailing the chamfered edge of rubber plug (1).

DETAILED DESCRIPTION OF THE PREFERRED EMBODIMENTS

Figure 1:
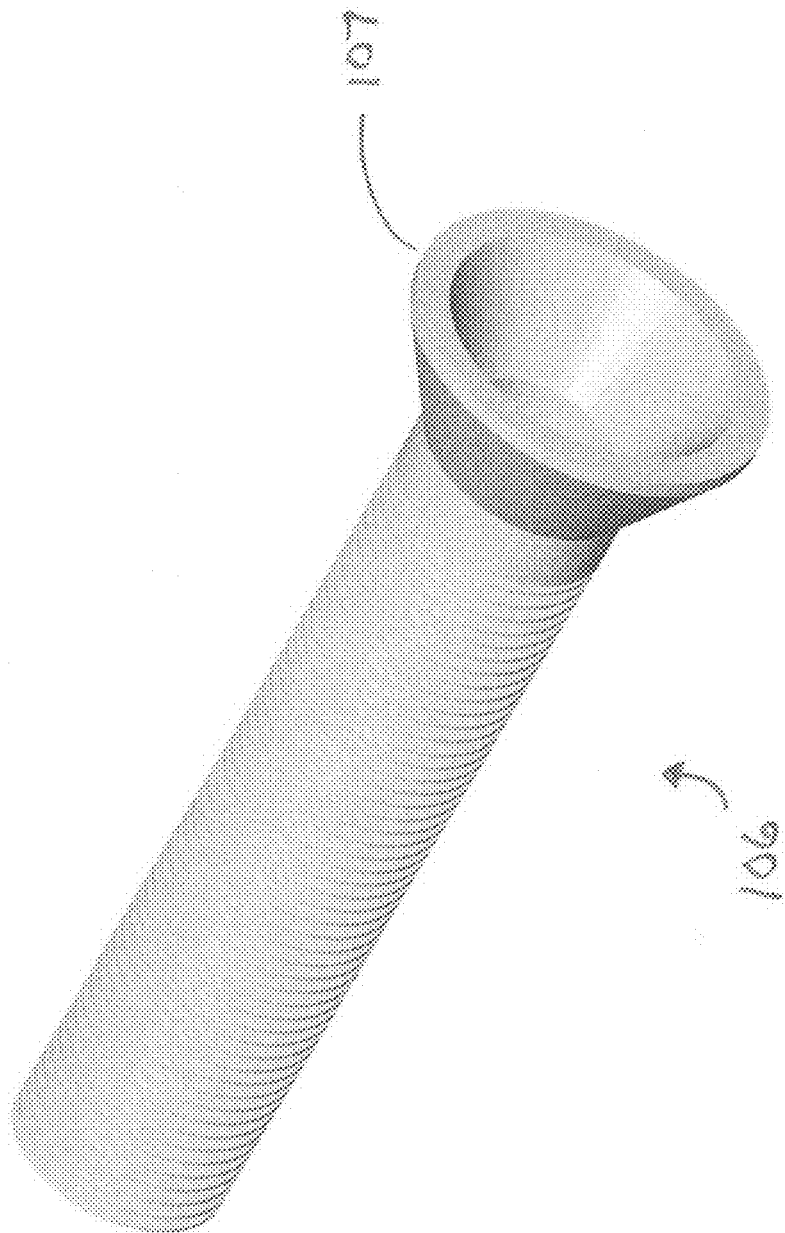
FIG. 1 is a perspective view of the center tube showing the flared end.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Figure 2:
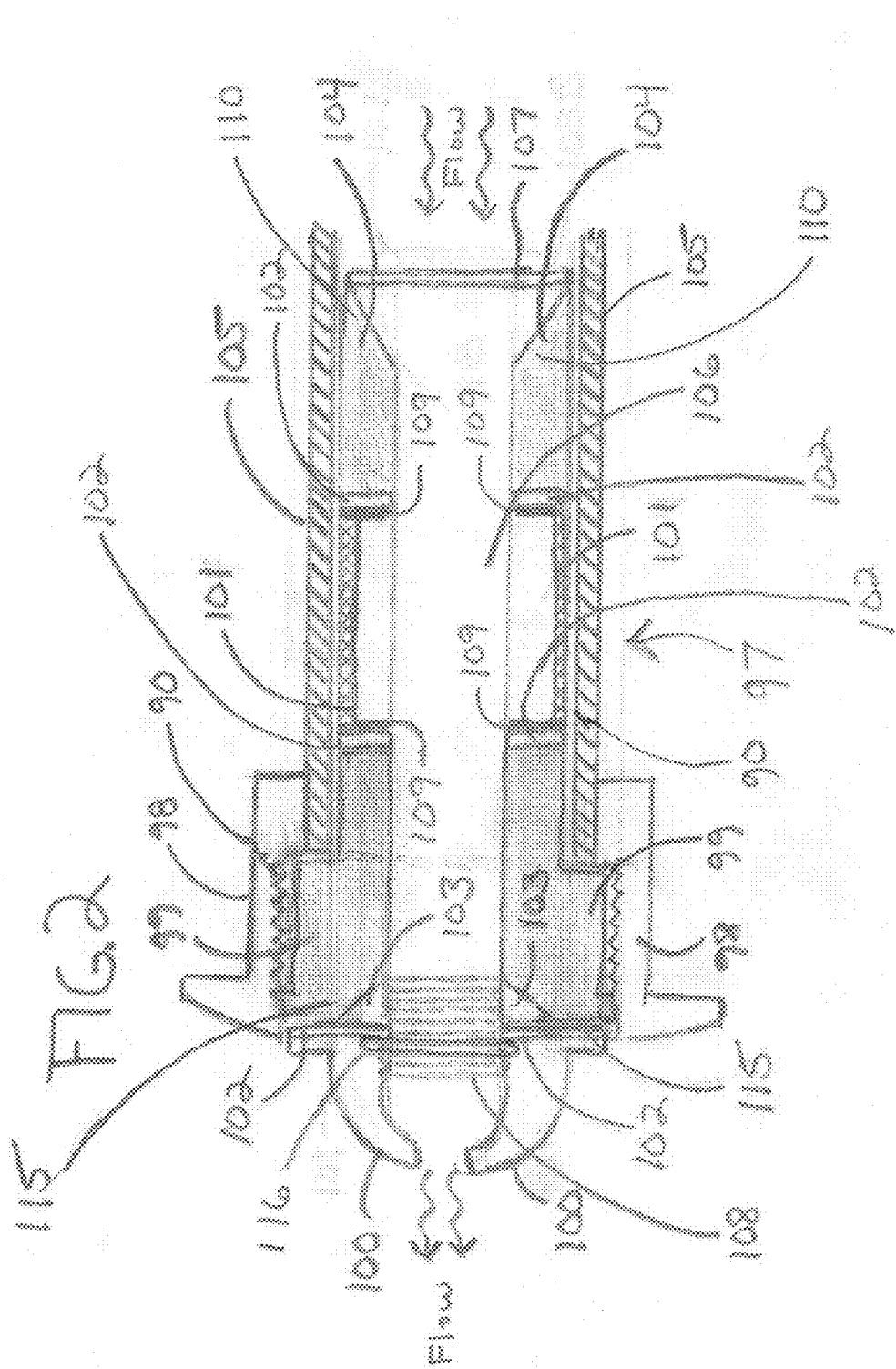
FIG. 2 is a sectional view of the apparatus of FIG. 1 in place, in a pool return fitting and pipe, in an uncompressed state.
Figure 3:
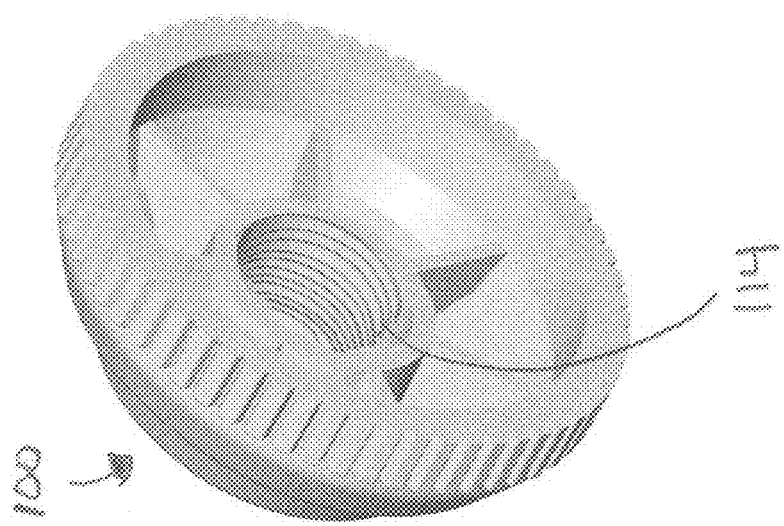
FIG. 3 is a reverse perspective view of the eyeball cap, showing the threading that mates with the center tube threading.
Figure 4:
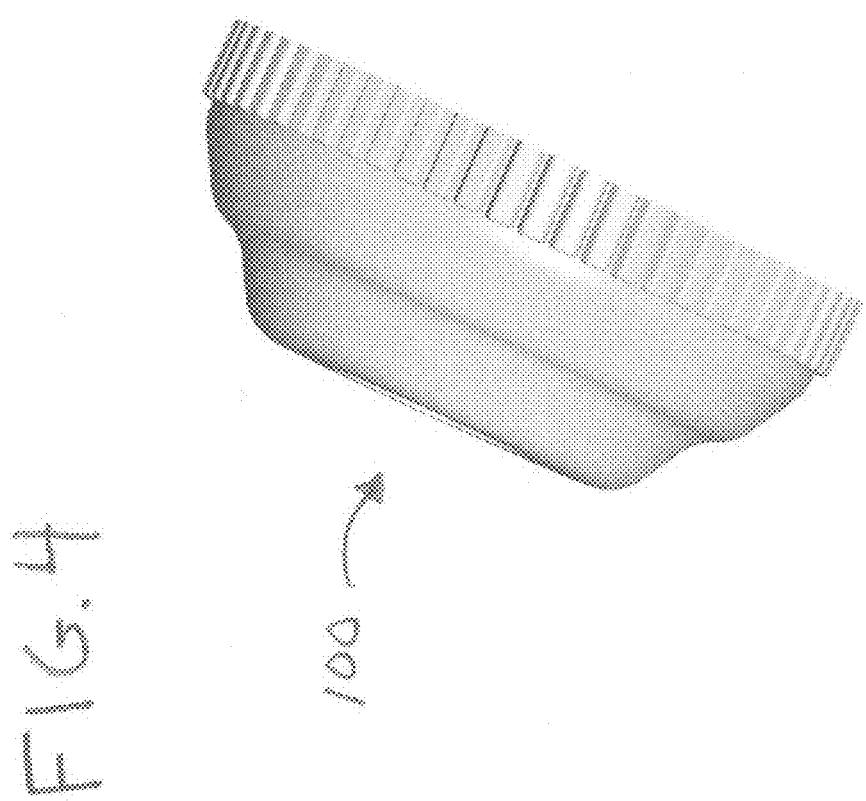
FIG. 4 is an elevation view of the eyeball cap.
Figure 5:
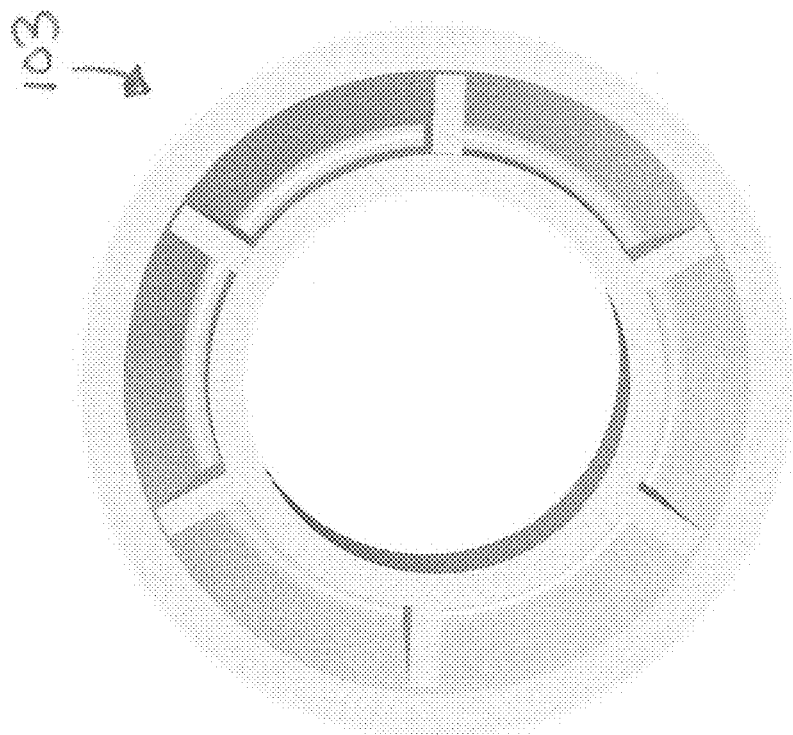
FIG. 5 is a top overhead view of the wedge that goes over the center tube against the rubber plug (1)
Figure 6:
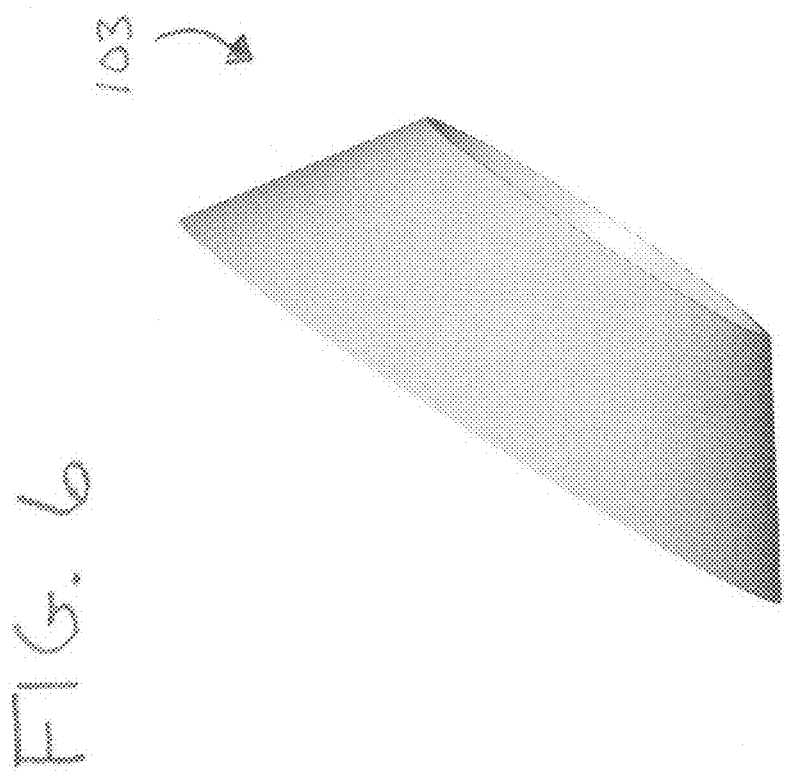
FIG. 6 is a slightly perspective elevation view of the wedge element.

Various elements, features and benefits of the embodiments on the present invention will be more apparent with regard to the following description in conjunction with the included drawings. Those skilled in the art that the described embodiments of the present invention included herein are illustrative only and not limiting, and are presented in the way of example only. The features represented in this description may only be substituted with alternate features serving same or similar purposes, unless otherwise expressed. Therefore, other embodiments of modifications thereof are contemplated as falling within the scope of present invention defined herein and equivalents thereto. Presently disclosed embodiments, as well as features and properties thereof, are directed to provide a method and apparatus with spacer for repairing a pool fitting. It should also become apparent from reviewing the drawings and descriptions, exemplary embodiments may allow a user to easily repair a pool return fitting or piping. A person of ordinary skill in the art will recognize the embodiments of the method and apparatus with spacer for repairing a pool fitting. In referring to the drawings of the invention of the method and apparatus with spacer for repairing a pool fitting:

FIG. 1-9 shows the apparatus 97 and various elements according to exemplary embodiments of the invention. The exemplary embodiments of the invention may include two cylindrical flow-thru rubber plugs 99, 104 hollow in the center; a center tube 106 flared 107 on one end and threaded 108 on the opposing end; two rubber plugs 99, 104, wherein a center tube 106 is seated thru the hollow center of the rubber plugs 99, 104; a center tube 106 retained at one end by a conically shaped flare 107; a center tube 106 retained on the threaded end 108 by a locking nut 116 over a washer 102, over a conical wedge 103 and two rubber plugs 99, 104 separated by a spacer tube 101, sealed by a washer 102 and a rubber washer 109 at each side of the spacer tube 101; a pool return eyeball cap 100, wherein internal female threading 114 enables said eyeball cap 100 to be mounted onto the threaded end 108 of the center tube 106, thus retaining a conical wedge 103 against the rubber plug (1) 99 in place; a method of installation of the present apparatus 97. Also depicted in some Figures is the internal areas of a pool return fitting 98, and the first several inches of the pool return line 105 (not fully depicted for clarity) of which is connected to the said fitting 98, and wherein the apparatus 97, when assembled, is inserted into the fitting 98 thru the pool return fitting 98 into the return pipe 105, and tightened via a locking nut 116 to a point by which a water-tight seal is created on both sides of the apparatus 97, thus isolating any leak due to a crack 90 in a pipe 105 or fitting 98, between the two opposing ends of the apparatus 97, whereby fluid is allowed to flow-thru the center tube 106 of the apparatus 97. FIG. 2 is a sectional view of the apparatus 97 in place in a pool return fitting 98 and return pipe 105 whereby the apparatus 97 is in an uncompressed state. The exemplary embodiments of the invention may include two cylindrical flow-thru rubber plugs 99, 104 hollow in the centers; a center tube 106 flared 107 on one end and threaded 108 on the opposing end; two rubber plugs 99, 104 wherein a center tube 106 is seated thru the hollow center of the rubber plugs 99, 104 being separated by a spacer tube 101 sealed at each end around the center tube 106 by means of two rigid washers 102 and two rubber washers 109; a center tube 106 retained on the threaded 108 end by a locking nut 116 over a rigid washer 102 rested against a rubber plug (1) 99; a pool return eyeball cap 100, wherein internal female threading 114 enables said eyeball cap 100 to be mounted onto the threaded 108 end of the center tube 106. When compressed by tightening the locking nut 116 onto the threads 108 of the center tube 106, the wedge 103 squeezes the apparatus 97 against the spacer tube 101, forcing the two rubber plugs 99, 104 to expand radially, thus coming into contact with the fitting 98 and the wall of the return pipe 105, thereby creating a seal at both ends of the apparatus 97. The direction of water flow, thru the apparatus 97, is indicated in the drawing of FIG. 2. Two examples of a crack 90 are depicted; one in the pool return fitting 98 and one on the pool return pipe 105, to indicate typical crack 90 locations commonly found in swimming pools and spas.

Figure 7:
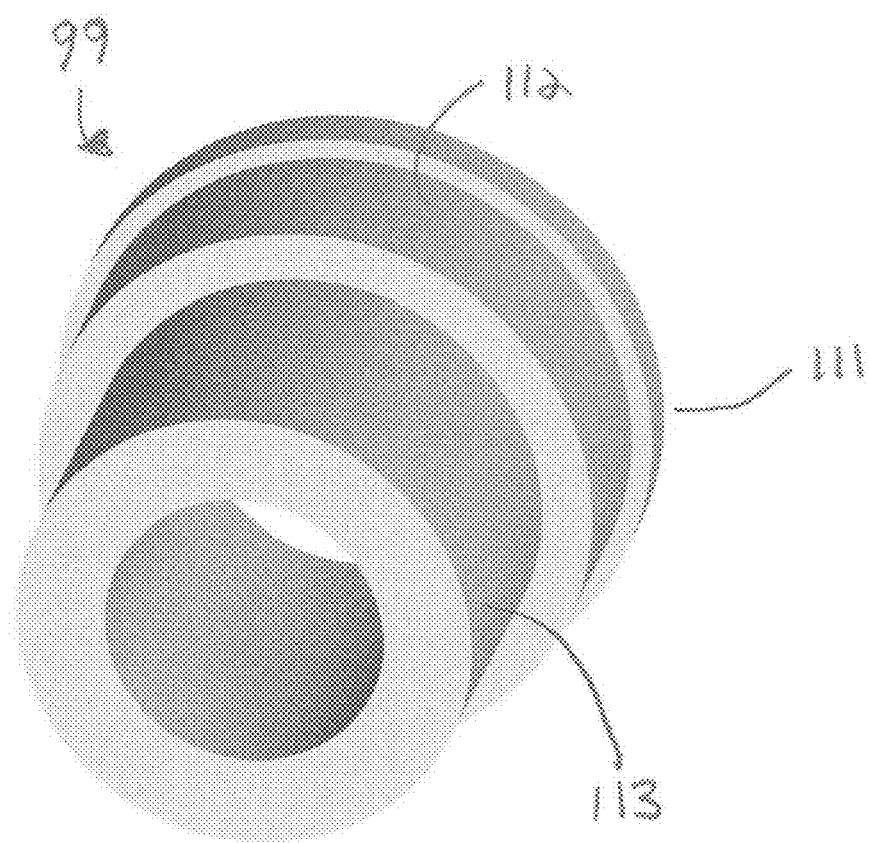
FIG. 7 is a perspective view of the rubber plug (1) detailing the body and tiers of rubber plug (1)
Figure 8:
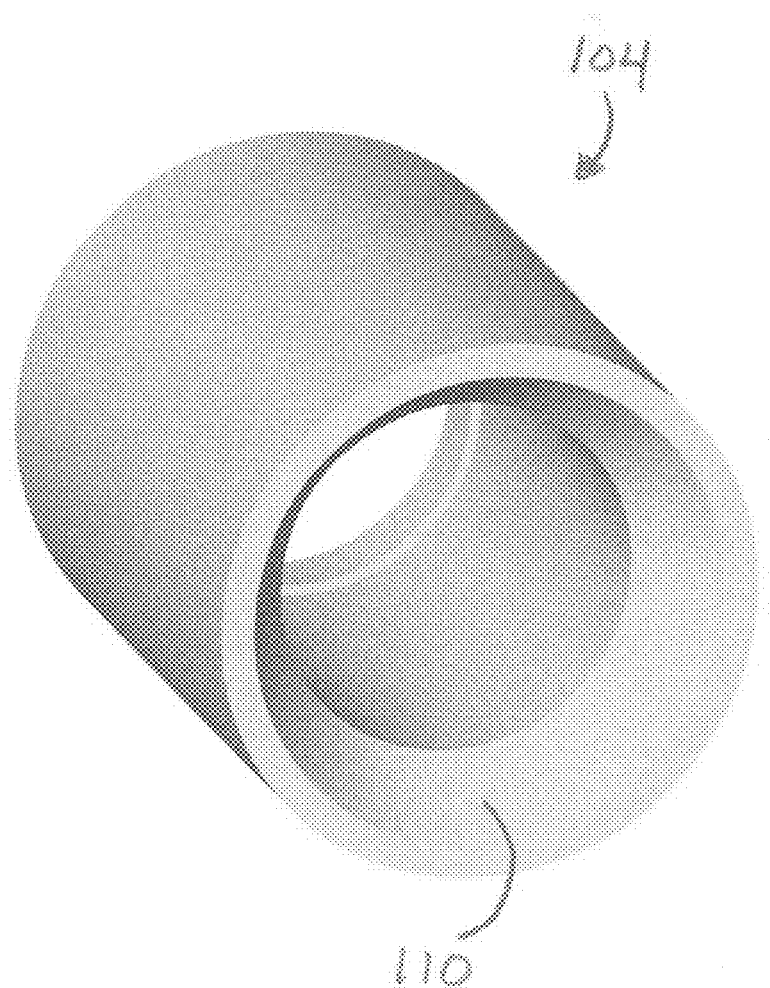
FIG. 8 is a perspective view of the rubber plug (2) detailing the chamfered edge of rubber plug (2)

FIGS. 2, 8 & 9 depict various views of rubber plugs (1) 99 and (2) 104, in which each respective rubber plug 99, 104 possesses the preferred embodiment of a chamfered internal edge 115, 110, that rests against the conical wedge 103 and the flared end 107 of the center tube 106, respectively. When compressed, the wedge 103 and flared end 107 of the center tube 106 are pressed against the spacer tube 101, thus causing the outside edges of the two rubber plugs 99, 104 to flare radially, enabling the two rubber plugs 99, 104 to make contact and seal against the pool fitting 98 and/or pool piping 105. When compressed, the apparatus 97 creates a water-tight seal on both ends, only allowing water to pass thru the center tube 106, thus isolating the crack/leak 90. FIG. 7 depicts the rubber plug (1) 99 detailing the upper tier 111, the lower tier 112 and the body 113 of rubber plug (1) 99. The tiers 111, 112 and body 113 of rubber plug (1) 99 loosely conform to the shape of a typical 1022/1023 fitting 98 of a swimming pool and/or spa. This shape enables rubber plug (1) 99, when radially expanding, to quickly seal against the fitting 98. The rubber plug (1) 99 may also be tierless, if a pool or spa does not utilize a 1022 fitting 98. Further, if the 1022 fitting 98 is connected to a larger pipe 105 size, an extension ring, as referred to in a previous application (Ser. No. 14/496,205 filed Sep. 25, 2014) of a method and apparatus of repairing a pool fitting (as ninety-nine), may be employed to increase the amount of radial expansion to allow the apparatus 97 to seal a larger size pipe 105.

The method and apparatus with spacer for repairing a pool fitting have been described using detailed descriptions of the embodiments that demonstrate by way of example and do not limit the scope of the present invention. Some embodiments of the present invention may only be used in some combinations of the present apparatus and method features. Variations and or combination of features of the embodiments will occur to persons of the art.

It will be appreciated by persons skilled in the art that the method and apparatus of the present invention is not limited by what was particularly described herein above. Rather, the scope of the method and apparatus with spacer for repairing a pool fitting and/or piping is defined by the attached claims.

The invention claimed is:

1. An apparatus for repairing a fluid leak thru a crack within the body of a pool return fitting, or in a pipe of close proximity to a pool return fitting, wherein said apparatus is comprised of: two cylindrical flow-thru rubber plugs hollow in the center; a center tube flared on one end and threaded on the opposing end; wherein said center tube is seated thru the hollow center of said rubber plugs, said rubber plugs are separated by a spacer tube sealed by a rigid washer and rubber washer on each end of the spacer tube; said center tube retained on the threaded end by a locking nut and rigid washer over a conical shaped wedge hollow in the center to allow the center tube to pass through; a pool return eyeball cap internally threaded in order to thread onto the threaded center tube; wherein said apparatus may be installed in a pool with or without water in the pool.

2. The apparatus of claim 1, wherein one of the rubber plugs is tiered cylindrically on one end in a manner that enables the plug to loosely fill a pool return fitting when uncompressed and is cylindrically chamfered on the other end to match the shape of the conical shaped wedge of claim 1.

3. The apparatus of claim 1, wherein one of the rubber plugs is chamfered on one end to match the shape of the flare of the center tube.

4. The apparatus of claim 1, wherein the center of the rubber flow-thru plugs are hollow and connect to pool return fitting and to pool return line.

5. The apparatus of claim 1, wherein the center tube, is threaded on one end and flared on the opposing end, whereby the flare retains a conical shape that secures an end of the tubing against the corresponding end of one of the rubber plugs.

6. The apparatus of claim 1, wherein the locking nut is tightened against the washer onto the threaded end of the apparatus, and makes contact with an end of one of the rubber plugs, and compresses the plugs against the rigid washers, rubber washers and spacer tube, thus creating radial expansion.

7. The apparatus of claim 1, wherein the spacer tube around the center tube is sealed on each end by means of a rubber washer against a rigid washer that rests against each respective rubber plug.

8. The apparatus of claim 1, wherein the swimming pool eyeball cap is internally threaded to mount onto the threaded end of the center tube over the locking nut and washer, being the means by which radial expansion of the apparatus is created.

9. The apparatus of claim 1, wherein the apparatus can be installed with or without water in a pool, spa, fountain or pond.

10. The apparatus of claim 1, wherein the two hollow rubber plugs are compressible.

11. The apparatus of claim 1, wherein in which the rubber flow-thru plugs have a shape of a cylindrical nature, hollow in the center to receive a pipe, and which the shape of the rubber flow-thru plugs facilitates radial expansion for the purpose of creating a water-tight seal while under compression.

12. The apparatus of claim 1, wherein the flow-thru rubber plug will expand radially against the conical shaped wedge, giving the ability to be installed in various size plumbing.

13. An apparatus of claim 1, wherein one cylindrical flow-thru rubber plug is comprised of tiered layers enabling said plug to seat into a pool return fitting with minimal clearance, and has an internally chamfered edge to mate against a conical wedge, and a second cylindrical flow-thru rubber plug has an internally chamfered edge to mate against a flare in the center tube.

14. The apparatus of claim 13, wherein the tiered layers conform to the shape of a 1022 or 1023 fitting.

15. The apparatus of claim 1, wherein one rubber plug is tierless.

* * * * *